May 31, 1966  E. J. JOHNSTON ETAL  3,253,394
REPLACEABLE RAKE TINE AND MEANS FOR MOUNTING SAME
Filed Oct. 8, 1964
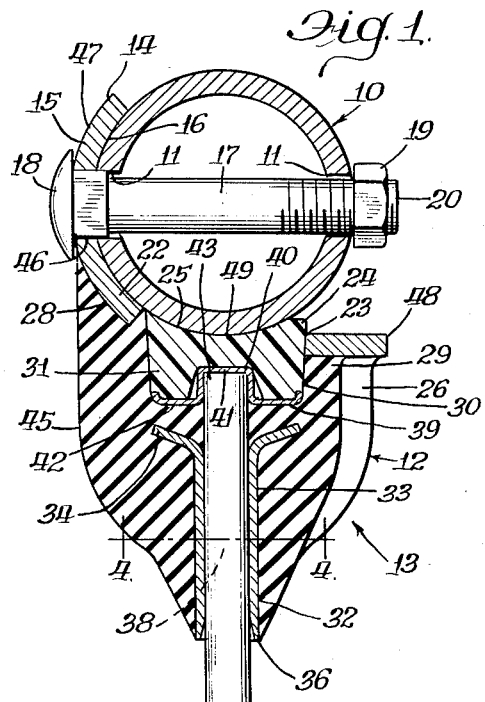
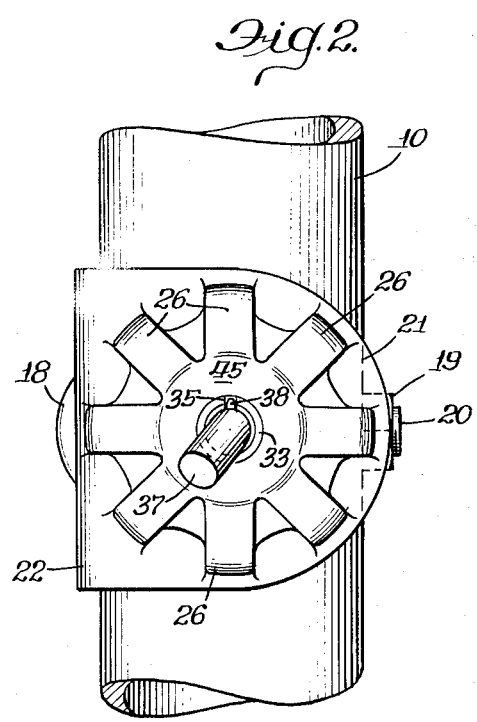
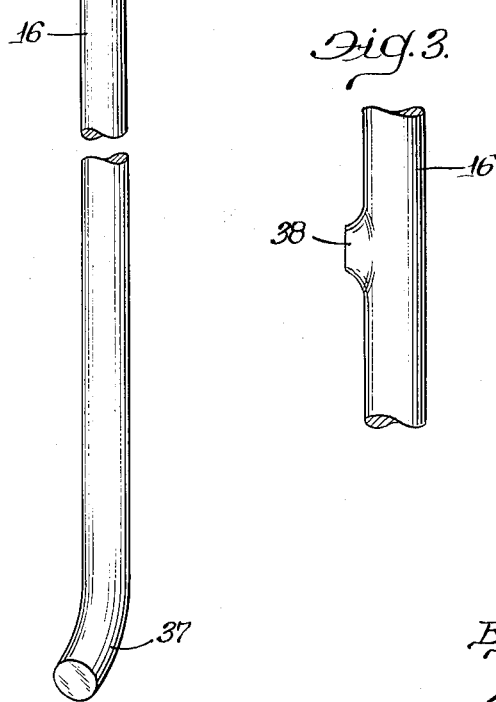
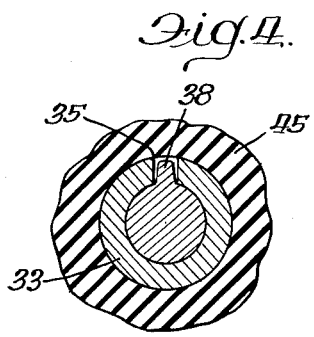
Inventors:
Edward J. Johnston
Frank J. Macha, Jr.
By: John J. Kowalik
Atty.

United States Patent Office 3,253,394
Patented May 31, 1966

3,253,394
REPLACEABLE RAKE TINE AND MEANS FOR MOUNTING SAME
Edward J. Johnston, La Grange, and Frank J. Macha, Jr., Chicago, Ill., assignors to International Harvester Company, Chicago, Ill., a corporation of New Jersey
Filed Oct. 8, 1964, Ser. No. 402,430
5 Claims. (Cl. 56—400)

This invention relates to farm implements. Particularly it relates to rakes and the like. Specifically it relates to a rake tooth construction adapted for use in a side-delivery rake or equivalent implement.

A conventional rake comprises a rake bar on which there are mounted or to which there are connected a plurality of depending rake teeth comprising tines. A side-delivery rake is a device adapted to move hay and the like into windrows which are parallel to the path of movement of and to one side of a vehicle which carries and supports the rake bar. For that purpose, a rake bar is generally disposed at an angle from the perpendicular of the path of movement of the vehicle carrying the rake bar. Furthermore, it is continuously power driven by a rotary mechanism in an elliptical path into and out of engagement with crop which is being raked to side deliver or deposit such crop into the windrows.

The rotary mechanism which drives a rake bar causes it to rise and fall in its path of movement to bring tines mounted thereon into repeated engagement with the ground. Furthermore, during a portion of the course of movement of the rake bar, the tines of necessity and particularly because of uneven terrain or poor adjustment by the operator are drawn across the ground surface. Accordingly, the teeth are subjected to wear resulting from erosion and jolting occurring in normal usage.

Conventionally, a rake tooth is individually releasably connected to a rake bar, whereby individual teeth may be replaced. For connection to a rake bar, an inner end portion of each tooth comprises a connector generally referred to as a clip. Conventionally, a clip may comprise a metal component which can be releasably bolted to a rake bar. A resilient block, fabricated from rubber or other elastomer material, which may be bonded or otherwise connected to the metal clip, itself forms a link between the inner end portion of a metal tine and the clip. A variation in conventional mountings for a rake tooth is provided by a clip in which a rubber or elastomer block is removably carried, with the inner end portion of a tine rigidly secured or bonded in said block.

It is apparent from the foregoing that when only a portion of a conventional rake tooth is damaged, more than the damaged portion will require replacement. Employing one conventional construction, an entire clip and block together with its tine will require replacement. Employing another, the rubber or elastomer block together with its tine will require replacement. In any regard, when employing prior devices, should replacement of a tine be indicated by reason of wear or damage to an outer end portion of such tine, the entire tine together with either its whole or a portion of its mounting or linkage to the rake bar must be replaced, notwithstanding that the mounting is in good repair.

In the prior art, a yieldable rubber-like or elastomer block is disclosed as including in the connector member by which a tine is connected to its rake bar. Thereby, flexibility is achieved which allows the connection member of a rake tooth to bend or yield in a flexion or extension type motion in response to stresses on its tine. However, the prior connectors, while of elastomer or rubber fabrication, are not constructed and designed to provide adequately for inward and outward movement of a tine with respect to its rake bar. In other words, while prior disclosures provide for bending of a connector, inadequate provision is made for compression of such connector. Tine loss from fracture or breakage due to particular forces could be obviated were a tine free to move upwardly and downwardly or if provisions were made for transmission or dissipation by another body of upward and downward forces brought to bear on a tine.

Accordingly, and as a primary object of the instant invention, an improved rake tooth construction is provided.

It is an additional object of the instant invention to provide a rake tooth construction having improved means for replaceably or releasably mounting a tine.

A yet further object of the instant invention is the provision of a rake tooth which includes a connector releasably mountable upon a rake bar and having a resilient portion in which there is securely anchored a permanent tine mounting member, a replaceable tine releasably connected to the tine mounting member, and a novel gripping member for releasably gripping said tine.

It is a yet further object of the instant invention to provide a rake tooth having a rake bar connector of bendable fabrication and in which the inner end portion of a tine is secured and having means to absorb inwardly directed forces and permit a tine to move inwardly, and urging the tine outwardly.

It is a yet further object of the instant invention that the means to absorb the inwardly directel forces be a compressible cushion disposed adjacent the inner end of a tine.

The foregoing and other objects, features and advantages of the present invention will become more apparent upon consideration of the following description and appended claims, when considered in conjunction with the accompanying drawings, wherein the same reference character or numeral refers to like or corresponding parts throughout the several views.

On the drawings:

FIG. 1 is a vertical sectional view of a rake bar and a connected tooth illustrating one embodiment of the instant invention, with a removable or replaceable tine shown in elevation, a section thereof broken away to conserve drawing area.

FIG. 2 is a view looking upwardly at a section of the rake bar from the bottom of FIG. 1.

FIG. 3 is an elevational view of a medial portion of the tine and showing the tine boss or lug.

FIG. 4 is a view taken substantially on the line 4—4 of FIG. 1 and looking in the direction of the arrows.

Referring now more particularly to the drawings, there is disclosed in FIGS. 1 and 2 an elongated rake bar 10. The rake 10 is of conventional metallic fabrication, and in the form shown in the drawings is an elongated hollow tube having a plurality of diametrically opposed openings 11 for a purpose which will become apparent hereinafter. The rake bar 10 has connected thereto a plurality of rake teeth, generally designated as 13, which depend radially from said rake bar 10. The rake teeth 13 are spaced apart longitudinally of said bar 10. Inasmuch as all of the rake teeth are substantially the same, only one thereof is illustrated in the drawings.

For the purpose of facilitating description herein, the terms "tooth" and "tine" are distinguished. "Tooth" defines generally that entire structure 13 which is releasably secured to the rake bar 10. "Tine" defines that elongated metal component 16 which depends from the rake bar 10 and comprises a portion of the "tooth." Restated, the "tine" is a part of the "tooth," and in this description "tine" and "tooth" are not used synonymously.

The rake tooth 13 comprises a connector, generally designated as 12, and the tine 16. The connector 12 comprises a clip 14 and a body or block 45 of a bendable or yieldable elastomer or rubber-like fabrication.

The clip 14 is in the shape of a "J" turned 90°. In the illustrated embodiment, said clip 14 is a bent metal plate which has an upper curved portion or leg 15 the inner concave surface 16 of which has a radius of curvature substantially equal to the external radius of curvature of rake tube 10 whereby the upper leg 15 will fit snugly against the rake bar 10, as illustrated in the drawings.

The upper leg 15 has an aperture 46 which registers and is disposed in alignment with the apertures 11. Thereby, a bolt 17 is accommodated with its head 18 drawn against the outer surface 47 of the upper leg 15 by means of a nut 19 which is releasably mounted on the threaded end 20 of said bolt 17.

Clip 14 comprises a lower substantially flat lobate-shaped leg or portion 21 which at its free end extends outwardly beyond the rake bar 10, as illustrated in FIGS. 1 and 2 of the drawings. The lower flat leg 21 and the upper curved leg 15 of said clip are connected together by a medial, integral clip section 22.

The flat part or leg 21 has therein substantially medially of the sides thereof an opening or hole 23 to accommodate a removably mounted pad, cushion or block 24 fabricated from an elastomer, highly yieldable or compressible material such as, for example, rubber, vinyl, styrene foam, other plastic or the like. As illustrated in FIG. 1, the compressible block, pad or cushion 24 extends through the aperture 23 with its upper surface 25 bearing against a lower surface area of the rake bar 10.

The rubber or elastomer body or block 45 appears somewhat like an inverted dome. It has a plurality of integral elongated external ribs 26 extending longitudinally of the block 45, as illustrated in FIGS. 1 and 2 and only some of which have been numbered. The upper surface 27 of the block or body 45 is bonded or sealed to a portion 28 of the lower surface defining the medial clip section 22 and the leg 21 about the opening or aperture 23. Such bonding or securance is by conventional process well known in the art.

Beneath and in alignment with the aperture 23, the body or block 45 has a well or seat cavity 30 which, in the illustrated embodiment, is limited to an upper portion 29 of body 45. The lower end portion 31 of the cushion, pad or block 24 is removably disposed or seated in said cavity 30, as illustrated in FIG. 1.

An elongated vertical aisle, tunnel or passage 32, opening upwardly into well or seat cavity 30, extends downwardly therefrom through the bottom of the body or block 45. The aisle, passage or tunnel 32 preferably is disposed substantially centrally with respect to the cavity or well 30 and also with respect to the bulk of the fabric of block 45, as illustrated in FIG. 1. An elongated tube or tine mounting member 33 which may be circular in cross section is disposed in the tunnel or aisle 32.

The outer surface of said tube is sealed or bonded or otherwise suitably secured to the fabric or block 45 defining aisle or passage 32. To anchor additionally the tube or tine mounting metallic member 33, an upper end portion thereof is outwardly flared to provide an anchor 34 which is embedded in and bonded or sealed to the material fabric of the block 45 in a position preferably spaced downward from the bottom of the well or cavity 30.

As illustrated in FIGS. 2 and 4, the tube 33 has an elongated slot or track 35 which serves as a guide, the purpose of which will be hereinafter described. At its lowermost end portion, the inner wall surface of the tube or tine mounting member 33 is flared outwardly as it extends downwardly, as seen at 36 in FIG. 1, to serve as a guide for insertion and mounting of tine 16 in tube 33.

The tine 16 is elongated, as illustrated in FIG. 1. It is preferably of metal fabrication in accordance with conventional practice for the fabrication of tines adapted for the use indicated. A lowermost end portion 37 is angularly bent, in accordance with conventional practice, to facilitate side delivery of raked material.

A medial portion of tine 16 has therein formed an integral lug, boss or shoulder 38 which extends outwardly from the outer surface of said tine, as illustrated in all of the drawings. The boss, lug or shoulder 38, while slidable vertically in the slot or track 35, is retained from rotation independently of the body 45.

A tine clamp or lock which may be in the form of a push nut 40, as illustrated in FIG. 1, is disposed in the cavity 30 between the bottom of the pad cushion or block 24 and the rubber or elastomer body or block 45 by which it is engageable upon opposite faces. The push nut 40 comprises a centrally upwardly struck tine locking portion 41 and an integral annular flange 42. Engagement of the flange 42 with the bottom portion 39 of the cavity 30 about the upper end of the tube or aisle 33 limits downward movement of said nut 40. The locking or gripping portion 41 is spaced above the bottom of the cavity 30 in vertical alignment with the upper end of the aisle or tunnel 32. Said locking or gripping portion is releasably clamped or locked on the top of an upper end extension 43 of the tine 16 which extends upwardly through the tunnel or aisle 32 into the cavity 30 in the manner illustrated in FIG. 1 of the drawings.

To assemble the rake tooth, the upper end portion 43 of the tine 16 is first directed into the flared opening 36, and with the boss or lug 38 engaging in the downwardly opening slot 35 the tine is pushed upwardly through the tube or tine mounting member 33 and until the upper end portion 43 extends into the cavity 30. The push nut 40 is then secured or clamped upon the upper end portion 43 of said tine. Engagement of the flange 42 with the base 39 of the cavity 30 will now hold the tine from downward movement independently of the lock or clamp 40. However, the tine is able to move upwardly and downwardly with the clamp or lock 40 limited in downward movement as aforesaid and in upward movement by tension in pad or block 24.

When it is desired to replace a tine, pad 24 is removed after dismounting of tooth 13 from bar 10. The push nut 40 which is thereby exposed is then removed from end portion 43. Thereafter the tine is replaceable.

The pad or cushion 24 is characterized by its vertical elasticity which distinguishes the instant structure from prior devices in which the elastomer blocks are constructed to provide for non-vertical movement. By reason of the substantial inward and outward tine movement now possible, heretofore tine breaking forces can be absorbed without tine damage.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. Rake tooth mounting means for mounting on a rake bar, comprising: a mounting block of elastomer material, means for securing the block to the bar, a sleeve secured to the block and having an axial bore, a tine of uniform cross-section projecting from the block and having an inner end slidably mounted within the sleeve for endwise movement relative to the block for replacement, said block deflectible transversely of the tine to accommodate transverse movement of the tine, and means releasably securing said tine within said sleeve.

2. The invention according to claim 1 and resilient means mounted on the block and reactive against the inner end of the tine for urging the same in a direction outwardly of the block.

3. The invention according to claim 1 and yieldable means interposed between the bar and said end of the tine, and said securing means connected to the inner end of the tine and movable therewith against said yieldable means to prevent accidental withdrawal of the tine from the block.

4. The invention according to claim 1 and said securing means comprising a push nut frictionally locking with the end of the tine and said block having a cavity receiving said push nut therein adjacent to the rake bar.

5. The invention according to claim 1 and said tine having a radial locking lug on its inner end portion and said sleeve having an axial groove receiving said lug to prevent rotation of the tine about its longitudinal axis.

References Cited by the Examiner

UNITED STATES PATENTS

| 2,054,129 | 9/1936 | Kelsey | 172—96 |
| 3,066,470 | 12/1962 | Johnston | 56—400 |
| 3,126,693 | 3/1964 | Renn | 56—400 X |
| 3,157,019 | 11/1964 | Brackbill | 56—400 |

ABRAHAM G. STONE, *Primary Examiner.*

RUSSELL R. KINSEY, M. C. PAYDEN,
*Assistant Examiners.*